Jan. 28, 1969  H. D. MONROE  3,424,978
RATE MEASURING CIRCUIT
Filed May 2, 1966
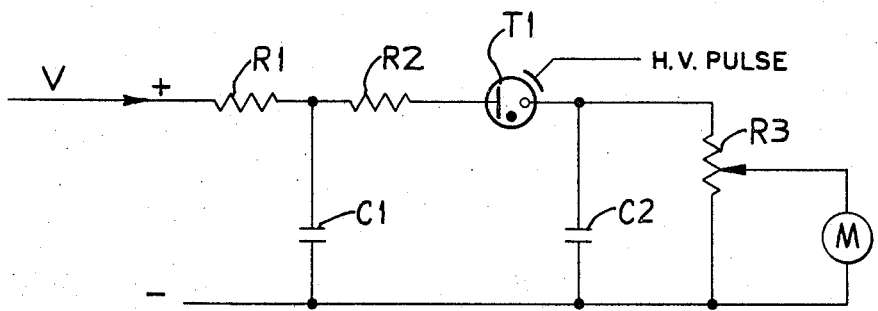
FIG_1
FIG_2
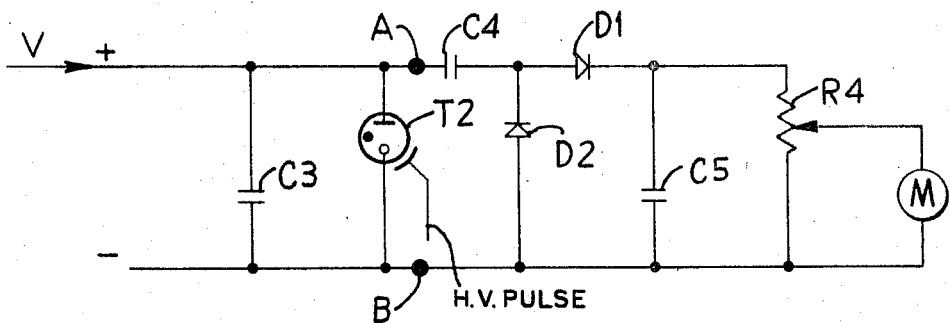
INVENTOR
HANFORD D. MONROE
BY *Francis W. Anderson*
ATTORNEY

United States Patent Office 3,424,978
Patented Jan. 28, 1969

3,424,978
RATE MEASURING CIRCUIT
Hanford D. Monroe, De Witt, Mich., assignor to FMC Corporation, San Jose, Calif., a corporation of Delaware
Filed May 2, 1966, Ser. No. 546,621
U.S. Cl. 324—70          1 Claim
Int. Cl. G01f 11/02

ABSTRACT OF THE DISCLOSURE

A rate measuring circuit which utilizes a gas filled diode periodically energized to conduction by a series of spaced high voltage pulses related in their timing to the angular velocity of an object such as an automobile wheel. The circuit includes an input capacitor adapted to maintain a predetermined potential during the nonconducting periods of the diode and to transfer a given amount of energy through the diode when it is conducting to a second integrating capacitor which feeds a relatively constant current through a meter located in a potentiometer network.

---

The present invention pertains to tachometer circuits and more particularly to tachometer circuits which are initiated by the application of an external, short duration, high voltage pulse.

In automobile timing or wheel balancing where a stroboscope is utilized, it has been found to be highly desirable to also have readily available some means for indicating the rotational speed of the object being timed. For example, in wheel balancing wherein a strobe light is used to indicate the position of unbalance in the wheels, a tachometer circuit is a valuable auxiliary tool since the amount and nature of the unbalance may vary at different rotational speeds.

It is therefore the primary object of the present invention to provide a simple and inexpensive circuit which will utilize the high voltage trigger pulse necessary to operate the stroboscope or flash lamp to, in turn, operate an auxiliary tachometer.

This and other objects and advantages of the present invention will become more apparent from the following description and accompanying drawing, in which:

FIGURE 1 is a schematic diagram of a tachometer circuit embodying the present invention and being designed for operation in conjunction with an associated stroboscope circuit.

FIGURE 2 is a schematic diagram of a second embodiment of a tachometer circuit utilizing the present invention and designed for operation with a conventional flash lamp circuit.

Referring more particularly to the drawing, FIGURE 1 illustrates a tachometer circuit which is particularly adapted for use with an electronic circuit for application in wheel balancing apparatus and is designed to be energized by the high voltage triggering pulses used to fire the flash lamp or strobe light necessary for determining the position of wheel unbalance. A constant D.C. potential V is applied to the resistor R1 to maintain a gas-filled neon glow lamp T1 at a normal potential which is chosen to be slightly less than that potential required for ionization of the gas in the tube and consequent conduction of current. The shunting capacitor C1 will, of course, be charged to level of the input voltage V. When the controlled rectifier tube T1 is triggered by the application of an external, short duration, high voltage pulse, the gas within the tube is ionized and the tube is placed in a conducting state. During conduction energy is transferred from the capacitor C1 to a capacitor C2 in parallel with a meter M. When the potential across the input capacitor C1 has been reduced below that value needed to maintain ionization of the gas within the tube T1, conduction through the tube will cease and capacitor C1 will be recharged to the supply voltage V to await the next high voltage signal pulse. During the conduction period, the internal resistance of tube T1 will of course be much lower than in the nonconducting state, and a small resistor R2 is used to limit the maximum current through the tube. The input resistor R1 is chosen so that the voltage division which takes place between R1 and T1 during conduction results in a potential applied to T1 which will be less than the necessary voltage required to maintain conduction through the tube T1 upon sufficient discharge of the capacitor C1.

The capacitor C1 and resistor R1 thus comprise an RC time constant network which has been chosen to permit C1 to be fully charged during the nonconducting portion of the operating cycle but to prevent the continuous conduction of tube T1 when C1 is discharged by the external triggering of the gas diode T1. By way of example, when a D.C. source voltage of 200 v. is applied to a common neon tube glow lamp, such as a type A-153 manufactured by Signalite Inc. of Neptune, N.J., a practical and useful circuit has been devised wherein R1 is 33K ohms, C1 is 0.4 microfarad, and the small series resistor R2 in series with the glow tube has a value of 4.7 ohms.

Energy from the circuit of FIGURE 1 is thus delivered to the meter M through a potentiometer R3 from the capacitor C2 which functions as an integrating device storing the pulse energy from the tube and delivering it in a relatively constant output to the meter. The potentiometer or variable resistor R3 serves as a calibrating device to permit the meter to be adjusted so that its reading in terms of rotational speed may be related to the number of timing pulses delivered to the circuit. Once the diameter of the object being timed is known and the circuit parameters have been found, the meter deflection reading may easily be calculated.

FIGURE 2 shows an alternate circuit which may be utilized with any typical flash lamp circuit. The conventional flash lamp circuit, which might be used for automobile ignition timing, for example, consists of a flash tube T2 in parallel with a storage capacitor C3 which is driven by a D.C. voltage source V that is maintained at a level slightly below that needed to initiate conduction through the tube. As with the glow tube of the previous example, conduction through the flash tube is initiated by an external high voltage triggering pulse related to the angular velocity of the object being timed which permits conduction in the circuit for a period of time sufficient to partially discharge the capacitor C3.

The tachometer circuit is connected to the basic flash lamp circuit as indicated by the circuit configuration to the right of points A–B. In this circuit, capacitor C4 will be alternately charged and discharged in conjunction with the charging and discharging of the storage capacitor C3 in the flash lamp circuit. The diodes D1 and D2 act as switching devices to direct the energy transferred through the capacitor C4 to a capacitor C5. The capacitor C5 serves an integrating function with the meter M and its variable series resistor R4 so that the meter can be calibrated to indicate a rotational speed in accordance with the number of pulses received per given unit of time.

It can be seen that the two tachometer circuits disclosed provide an easy and inexpensive way to include a tachometer reading with a stroboscope circuit. Such a reading can be of considerable value in the use of stroboscopic or timing circuits since it will give the person using the circuit a ready reference at all times to the angular velocity values during the flash lamp or timing study.

While but two circuit embodiments of the present invention have been shown and described, it will be understood that various changes and modifications may be made therein without departing from the spirit of the invention of the scope of the appended claim. The invention having thus been described what is believed to be new and desired to be protected by Letters Patent is:

1. A rate measuring circuit comprising a D.C. source of electric potential including positive and negative terminals, a first capacitor connected across said terminals, a controlled diode connected across said terminals, said diode being rendered effective for conducting current when a high voltage pulse is applied thereto and of maintaining said conduction until the potential across said first capacitor is reduced to a predetermined value, means for applying spaced high voltage pulses to said diode at a certain rate, a second capacitor connected at one end to said positive terminal, a second diode having its cathode connected to the other end of said second capacitor and its anode connected to said negative terminal, a third diode having its anode connected to said other end of said second capacitor, a third capacitor connected between the cathode of said third diode and said negative terminal, a potentiometer connected in parallel with said third capacitor, and a current-reading meter connected at one end to the sliding leg of said potentiometer, the other end of said meter being connected to said negative terminal whereby the meter reading is proportional to said rate at which said pulses are applied to said controlled diode.

References Cited

UNITED STATES PATENTS

| | | | |
|---|---|---|---|
| Re. 22,572 | 11/1944 | Miller | 324—70 |
| 2,068,147 | 1/1937 | Miller | 324—70 |
| 2,226,185 | 12/1940 | Sturm | 324—70 |
| 2,232,959 | 2/1941 | Miller | 324—70 |
| 2,817,058 | 12/1957 | Weidner | 324—16 |

OTHER REFERENCES

Radio and Television News: v. 56, No. 5, November 1956, pp. 70, 71, 124, Cordes.

RUDOLPH V. ROLINEC, *Primary Examiner.*

MICHAEL J. LYNCH, *Assistant Examiner.*

U.S. Cl. X.R.

324—078.